United States Patent [19]
Kawaoka

[11] Patent Number: 5,480,236
[45] Date of Patent: Jan. 2, 1996

[54] LINE MEMORY CONTROLLER FOR PRINTER AND METHOD THEREOF

[75] Inventor: Yoshiki Kawaoka, Saitama, Japan

[73] Assignee: Fuji Photo Film Co., Ltd., Minami-ashigara, Japan

[21] Appl. No.: 219,298

[22] Filed: Mar. 28, 1994

[30] Foreign Application Priority Data

Mar. 29, 1993 [JP] Japan ..................... 5-069788

[51] Int. Cl.⁶ .................. B41J 2/32; H04N 1/00
[52] U.S. Cl. ..................... 400/120.01; 395/164
[58] Field of Search .......... 400/120.01, 120.02; 395/115, 116, 162–164; 358/404, 444

[56] References Cited

U.S. PATENT DOCUMENTS 5,146,546  9/1992  Neuhard et al. .............. 395/115
5,191,430  3/1993  Sudoh et al. ................ 358/296

FOREIGN PATENT DOCUMENTS 306047  12/1988  Japan ....................... 400/121

Primary Examiner—Edgar S. Burr
Assistant Examiner—Steven S. Kelley

[57] ABSTRACT

A CPU executes an operation of writing image data of one line into a line memory group, and a read controller executes an operation of reading image data of one line from the line memory group. If an up-down counter outputs a write request signal, CPU fetches a 2-bit count of a write counter. In accordance with the count, CPU outputs a write line memory address for designating an address of a line memory, and writes image data of one line read from a frame memory into the designated line memory. Immediately after CPU starts writing the image data, a write start signal is supplied to the write counter and up-down counter to increment the count value thereof. The up-down counter generates a write request signal if the count is smaller than the number N of line memories. A read counter counts a one line print end signal to designate a line memory from which image data is read.

6 Claims, 5 Drawing Sheets

LINE MEMORY CONTROLLER FOR PRINTER AND METHOD THEREOF

BACKGROUND OF THE INVENTION

1. Field of the Invention

The present invention relates to a line memory controller for use in a printer, and more particularly to a printer line memory controller in which image data of each line is read and written in parallel by using a plurality of line memories.

2. Description of the Related Art

In thermal printers, wire-dot printers, ink jet printers, and the like, image data of one line is read from a frame memory and written into a line memory. Thereafter, the image data in the line memory is read and supplied to a head driver. Generally, two line memories are used, and while image data is written into one line memory, image data in the other line memory is read. If a plurality of line memories (hereinafter called a line memory group) are used, two control circuits are used, one being a write control circuit for controlling to write image data into the line memory group and the other being a read control circuit for controlling to read image data from the line memory group.

Although it is necessary to periodically read image data from the line memory group, data write can be performed at any desired timing. In order to simplify the system structure, it is possible to omit the write control circuit, by operating CPU to directly write image data into the line memory group. In this case, three or more line memories are used, and when CPU can intercept a task presently processed, CPU write image data into the line memory group. In writing image data, it is necessary for CPU to manage an address of a line memory to write into next, and to control the timings of writing image data, and to perform other necessary processes. However, if these line memory management and timing control are imposed on CPU which processes other various tasks, a load on CPU becomes great lowering the process speed of the whole system.

SUMMARY OF THE INVENTION

It is a principal object of the present invention to provide a printer line memory controller capable of simplifying a line memory address management and write timing control.

it is another object of the present invention to provide a printer line memory controller in which a CPU is not required to manage line memory addresses and to control write timings.

The above and other objects of the present invention can be achieved by providing a write counter, a read counter, and an up-down counter which perform a line memory address management for designating one of line memories to write into next and controlling data write into the designated line memory. CPU writes image data into the line memory group by using output signals from these counters.

The write counter counts a one line write start signal indicating a start of writing image data to the line memory group so that a next line memory into which image data is written can be identified. The read counter counts a one line print end signal so that a line memory from which image data is read can be identified. The up-down counter counts up a write start signal and counts down the one line print end signal. If the count is equal to or smaller than "N−1", it outputs a signal requesting to write image data into one of line memories.

According to a preferred embodiment of this invention, after CPU confirms a generation of the write request signal, it designates a line memory to write into next in accordance with the count of the write counter, and writes image data of one line into the designated line memory. A read controller is activated by a one line print start signal, and reads image data of one line from a line memory designated by the read counter.

According to the present invention, the write counter, read counter, and up-down counter manage a line memory address so that CPU is not required to manage the line memory address and control write timings. Furthermore, the write counter designates a line memory to write into next, allowing a simple circuit to manage the line memory address.

BRIEF DESCRIPTION OF THE DRAWINGS

The above and other objects and advantages of the present invention will become apparent from the following detailed description of the preferred embodiments when read in connection with the accompanying drawings, in which.

DETAILED DESCRIPTION OF THE PREFERRED EMBODIMENTS

Figure 1:
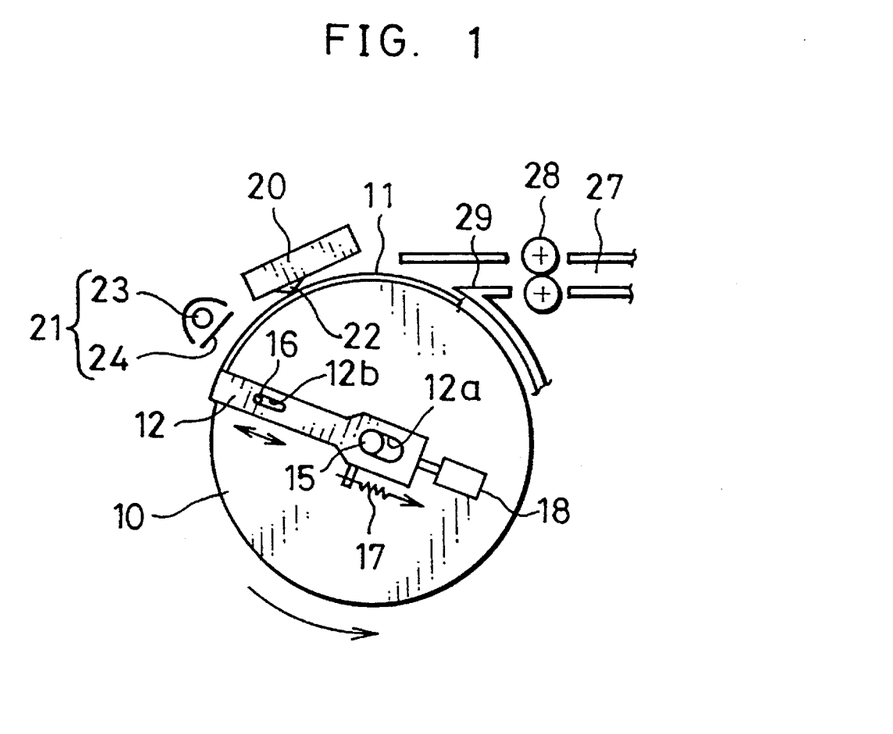
FIG. 1 is a schematic diagram showing an example of a color thermal printer.

In FIG. 1, a platen drum 10 carriers a sheet of thermosensitive color recording paper 11 on the outer periphery thereof, and is rotated by a pulse motor (not shown), during thermal recording and optical fixing. The platen drum 10 is provided with a clamper 12 which secures, for example, a leading end of the thermosensitive color recording paper 11 to the platen drum 10. The clamper 12 is of a channel shape and has through slots 12a and 12b at opposite end portions thereof with which a rotary shaft 15 of the platen drum 10 and a guide pin 16 are engaged. The clamper 12 is urged by a spring 17 to press the surface of the platen drum 10. When clamping and releasing the recording paper 11, the clamper 10 is moved to and away from the platen drum 10 by an act of a solenoid 18.

Figure 2:
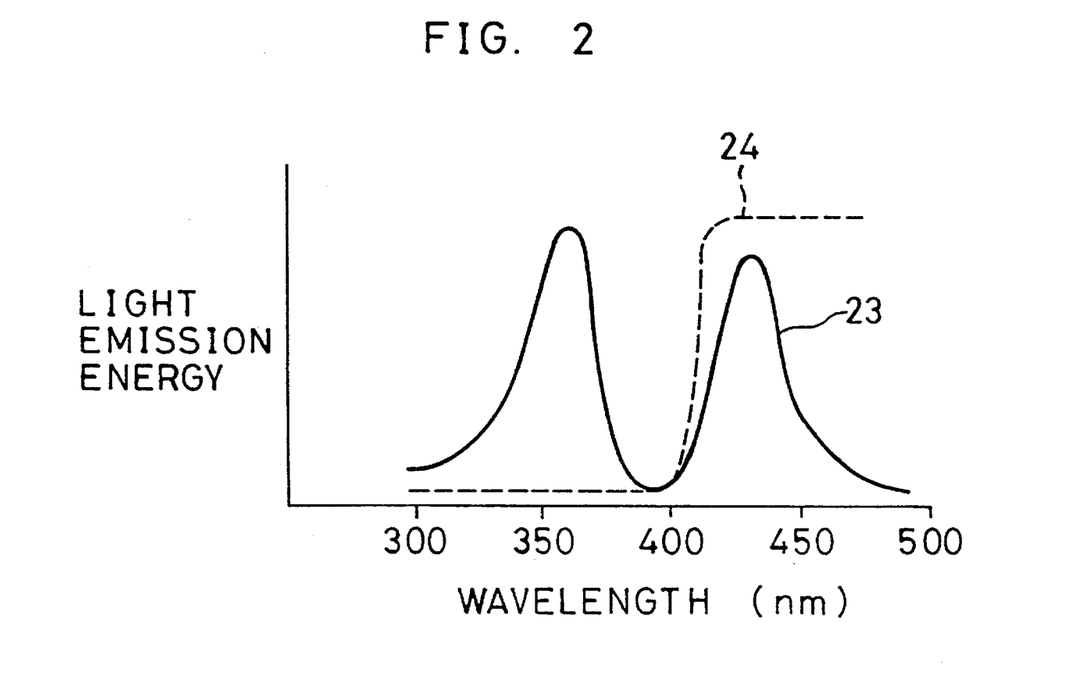
FIG. 2 is a graph showing the characteristics of an ultraviolet lamp and a sharp-cut filter, respectively of an optical fixing device.

Above the outer periphery of the platen drum 10, a thermal head 20 and an optical fixing device 21 are disposed. The thermal head 20 has a heating element array having a number of heating elements arranged in a line. The optical fixing device 21 includes an ultraviolet lamp 23 of a rod type having two emission center wavelengths of about 365 nm and 420 nm, as shown by a solid line curve in FIG. 2, and a sharp-cut filter 24 having a transmission curve as shown by a dashed line in FIG. 2. The sharp-cut filter 24 is placed at the front of the ultraviolet lamp 23 by a solenoid or another driving device, so as to transmit near ultraviolet rays having a wavelength range of only about 420 nm. Instead of one ultraviolet lamp 23, first and second ultraviolet lamps may be used which radiate ultraviolet rays having wavelengths of about 365 nm and 420 nm, respectively.

A paper feed path 27 is provided with a pair of feed rollers 28 which nip the thermosensitive color recording paper 11 and transport it. Downstream of the paper feed path 27, that is, on the side closer to the platen drum 10, a separation claw 29 is provided for peeling off the trailing edge of the recording paper 11 from the platen drum 10 and guiding the paper 11 to the paper feed path 27 when ejecting the paper 11. In this embodiment, the paper feed path 27 is commonly used for paper feeding and ejecting. Of course, it is possible to provide a paper ejection path separately from a paper feed path.

Figure 3:
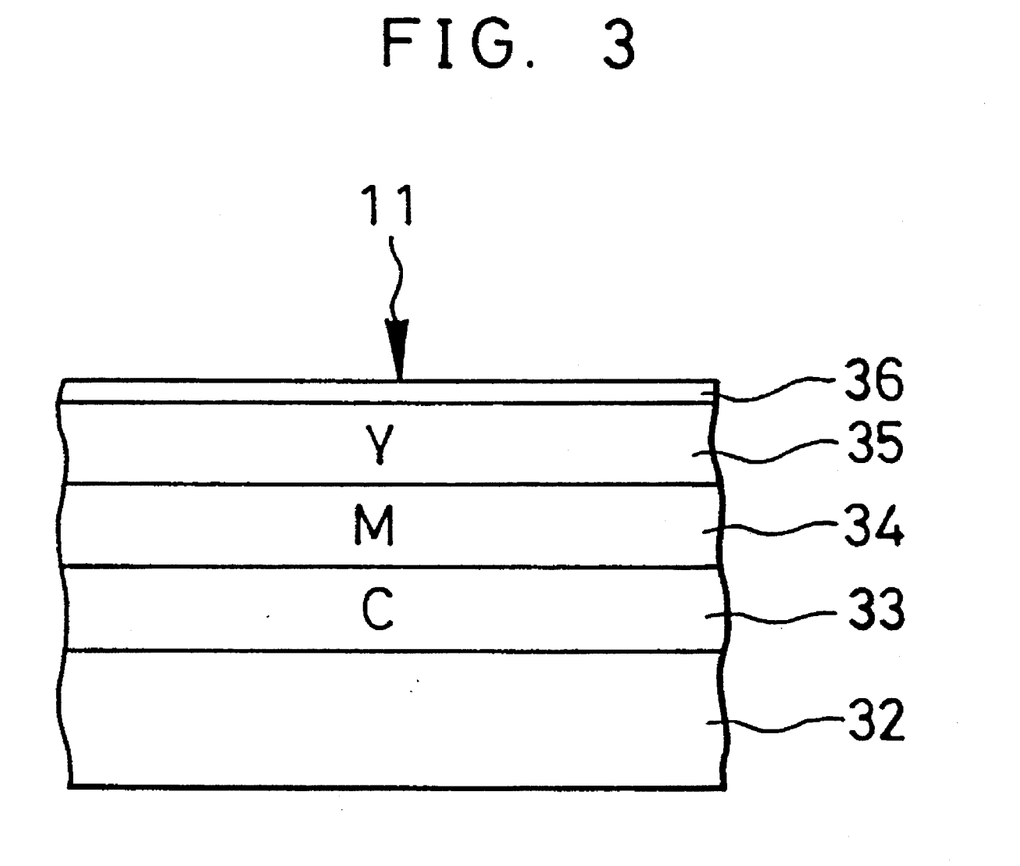
FIG. 3 is a diagram explaining the layer structure of a thermosensitive color recording paper.

FIG. 3 shows an example of the thermosensitive color recording paper, wherein a thermosensitive cyan coloring layer 33, a thermosensitive magenta coloring layer 34 having an optical fixing ability relative to ultraviolet rays having a wavelength of about 365 nm, and a thermosensitive yellow coloring layer 35 having an optical fixing ability relative to ultraviolet rays having a wavelength of about 420 nm, and a protective layer 36, are formed on a supporting member 32. In this embodiment, the thermosensitive yellow coloring layer 35 has a lowest coloring heat energy, and the thermosensitive cyan coloring layer 33 has a highest coloring heat energy. In a practical case, the thermosensitive color recording paper has intermediate layers and the like between thermosensitive coloring layers.

Figure 4:
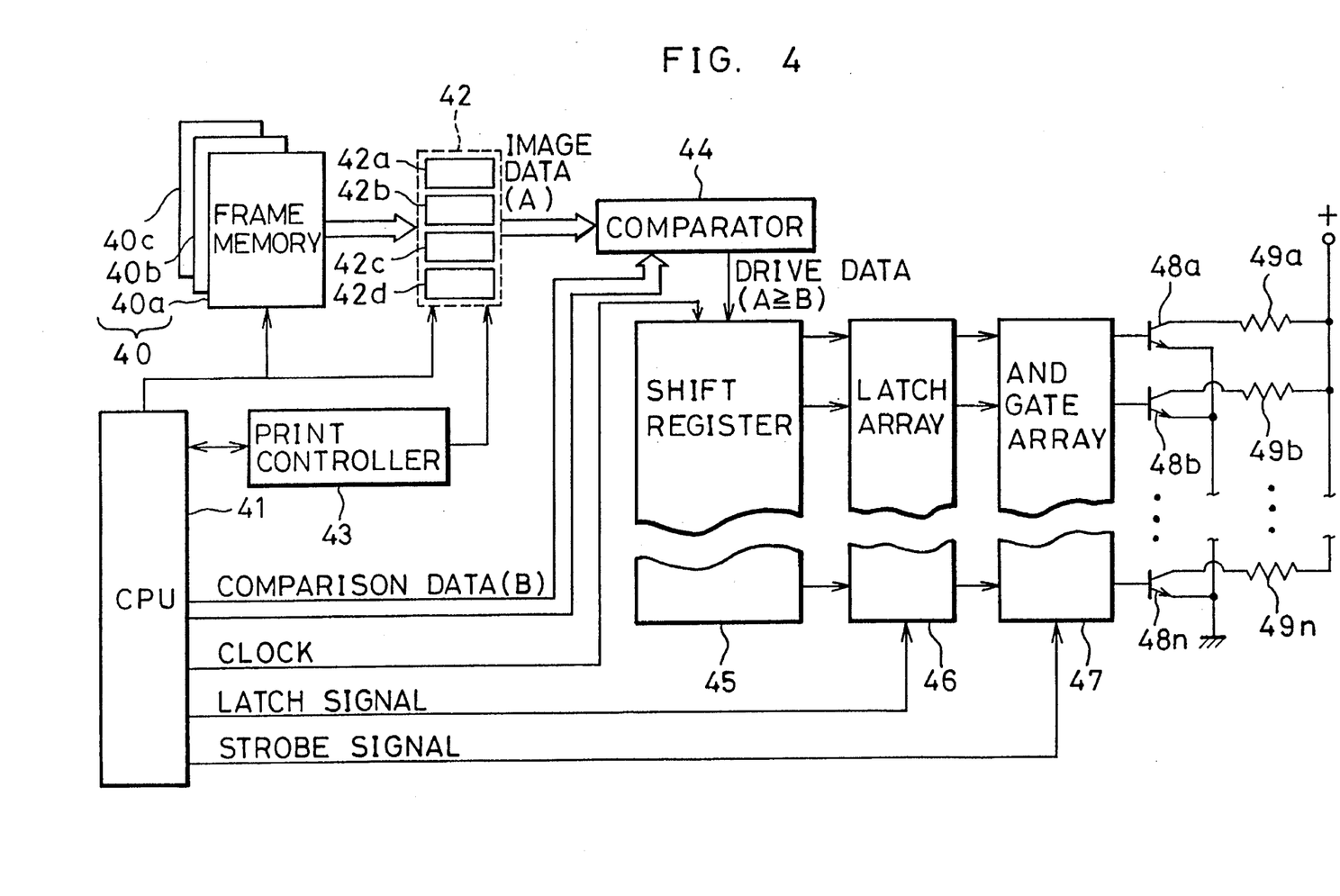
FIG. 4 is a block diagram of an electric circuit of a color thermal printer.

In FIG. 4 showing the outline of a printer unit, a frame memory group 40 has three kinds of frame memories 40a to 40c. An image taken, for example, by an electronic still camera is separated into blue, green, and red images and written in the frame memories 40a to 40c. When thermally recording the image, image data written in the frame memories 40a to 40c designated by a CPU 41 is read in units of one line and sent to the line memory group 42.

The line memory group 42 has four line memories 42a to 42d to and from which one line image data is written and read by CPU 41 and by a print controller 43. The line memories 42a to 42d are assigned addresses "00" to "11" which are used to designate one of the line memories 42a to 42d for the data read/write. In this embodiment, four line memories are used. The number of line memories may be increased or decreased. The greater the number of line memories, the less the load on CPU 41 necessary for writing data into the line memories. Therefore, it becomes possible to allow CPU 41 to continue other tasks for a longer time period.

Image data of each pixel of one line is read from a line memory designated by the print controller 43, and sent to a comparator 44. CPU 41 sequentially generates comparison data, for example, comparison data having tonal levels of "0" to "3F" in hexadecimal in the case of 64 tonal levels. The comparator 44 compares image data of each pixel of one line with comparison data having a gradation level "0" sent from CPU 41, and outputs "1" if the image data is equal to or larger than the comparison data, and "0" if the former is smaller than the latter. This data "1" or "0" is used as drive data. The drive data of one line serially output from the comparator 44 is supplied to a shift register 45.

After the comparison of image data of one line is completed, CPU 41 generates the next comparison data having a gradation level "1" and sends it to the comparator 44 which again compares it with image data of one line. Image data of each pixel is therefore compared 64 times and converted into drive data having 64 bits which are sequentially sent 64 times to the shift register 45. Serial drive data obtained at each comparison sequence is shifted in the shift register 45 synchronously with clocks, and converted in parallel drive data.

Parallel drive data converted by the shift register 45 is latched by a latch array 46 synchronously with latch signals. An AND gate array 47 outputs a signal having a level "1" for the input drive data "1" when a strobe signal is inputted. Each output terminal of the AND gate array 47 is connected to each of transistors 48a to 48n which turns on when the output of the AND gate array is "1". Each of the transistors 48a to 48n is serially connected to a corresponding one of heating elements 49a to 49n which may be a resistive element.

Figure 5:
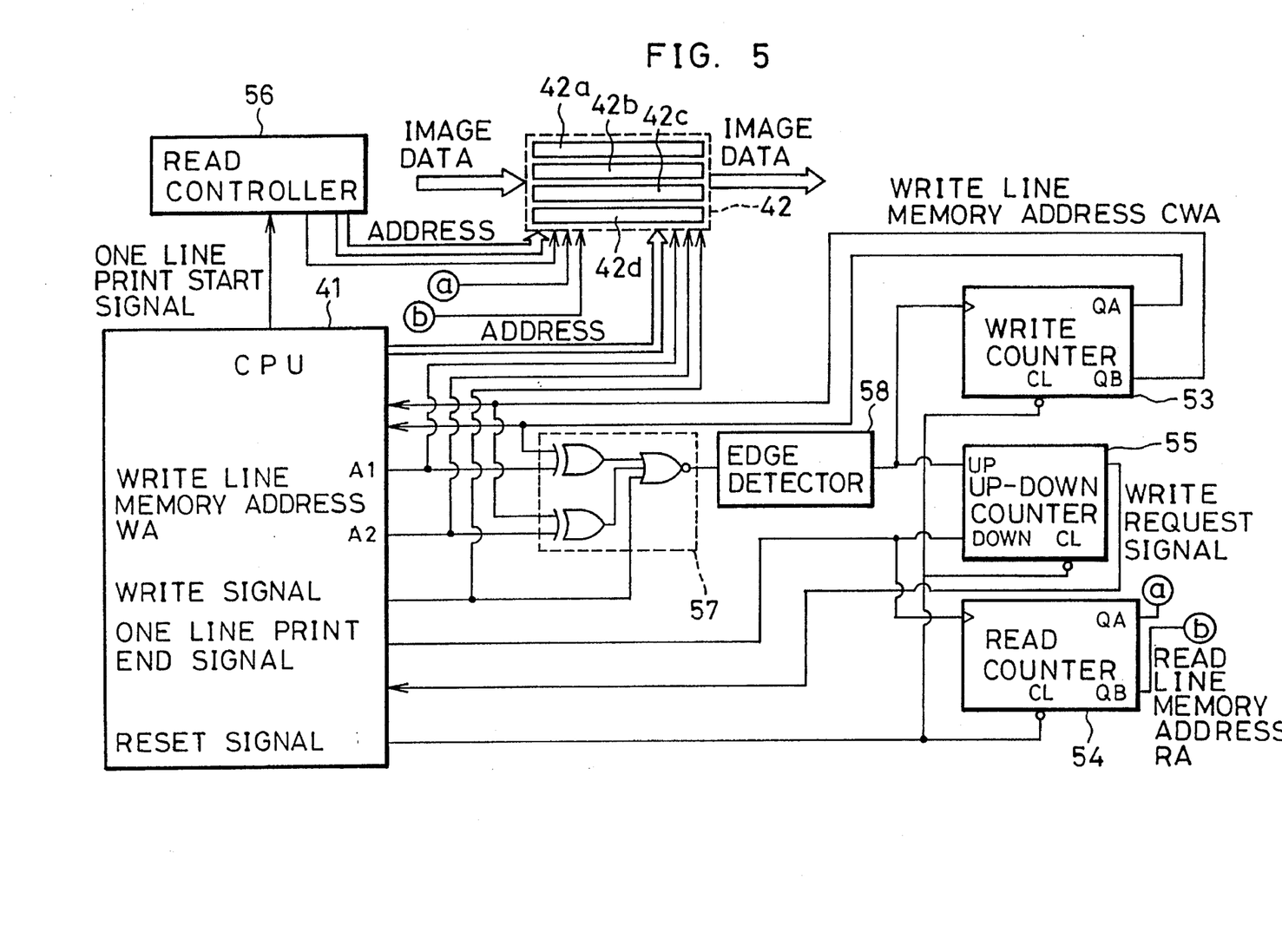
FIG. 5 is a block diagram of the printer controller of the printer shown in FIG. 4.

As shown in FIG. 5, the print controller 43 includes a write counter 53, a read counter 54, an up-down counter 55, a read controller 56, a gate circuit 57, and an edge detector 58.

The write counter 53 is a 2-bit counter and outputs a write line memory address CWA from two output terminals QA and QB. The read line memory address CWA is represented by a binary number of "00" to "11" which designates the line memory to write into next. In writing image data of one line read from one frame memory of the frame memory group 40 into the line memory group 42, CPU 41 receives the write line memory address CWA and sends it as a write line memory address WA to a port A of the line memory group 42 and to the gate circuit 57.

CPU 41 starts an operation of writing image data of one line when the task having been processed by CPU 41 can be intercepted. CPU 41 generates an address for designating a memory cell in a line memory and a write signal for writing image data of one pixel into the designated memory cell, and sends them to the port A of the line memory group 42. With these signals supplied, image data of one line is sequentially written one pixel after another into the line memory designated by the write line memory address WA. The write signal becomes "0" each time image data of one pixel has been written in the line memory.

The gate circuit 57 outputs a signal "1". If the write line memory address WA from CPU 41 and the line memory address CWA from the write counter 53 coincide with each other and when CPU 41 generates the write signal. As will be later described, an output signal of the gate circuit 57 is always "0" excepting that it takes "1" only during the period while the write signal for the first pixel in one line is being supplied.

The edge detector 58 outputs one pulse when an output signal of the gate circuit 57 transits from "0" to "1". This pulse is sent as a write start signal to the write counter 53 and to an up-terminal of the up-down counter 55. When the write counter 53 counts the write start signal, the gate circuit 57 is closed so that the write counter 53 stops its count operation until the image data of one line has been written completely. In this manner, the write counter 53 counts the pulse signal from the edge detector 58 only when writing the image data of one line starts, and therefore stores the address of the line memory to write into next.

The read counter 54 is a 2-bit counter and has two output terminals QA and QB from which a read line memory address RA is output. This read line memory address RA is represented by a binary number of "00" to "11" which is sent to a port B of the line memory group 42 for designating a line memory from which image data is read.

The up-down counter 55 counts up the write start signal from the edge detector 58 and counts down a one line print end signal from CPU 41. If the count is within a range from "0" to "3" in decimal, i.e., if there is one or more idle line memories, the up-down counter sends a write request signal "0" to CPU 41. An "idle" line memory means both a line memory in which image data is still not written and a line memory having image data which has been already converted into drive data and is not unnecessary. If image data is written in all the line memories 42a to 42d, the count is "4". In this case, the output of the up-down counter 55 is "1" and the write request signal "0" is not supplied to CPU 41. The one line print end signal is outputted from CPU 41, for example, when strobe signals are generated 64 times.

Upon reception of a print start signal from CPU 41, the read controller 56 generates an address for designating a memory cell in each line memory and a read signal for reading image data from the designated memory cell, and sends them to the port B of the line memory group 42. The line memory to be read is designated by an output from the read counter 54. The print start signal is generated by CPU 41, for example, immediately after the platen drum 10 is moved by one row intermittently.

Figure 6:
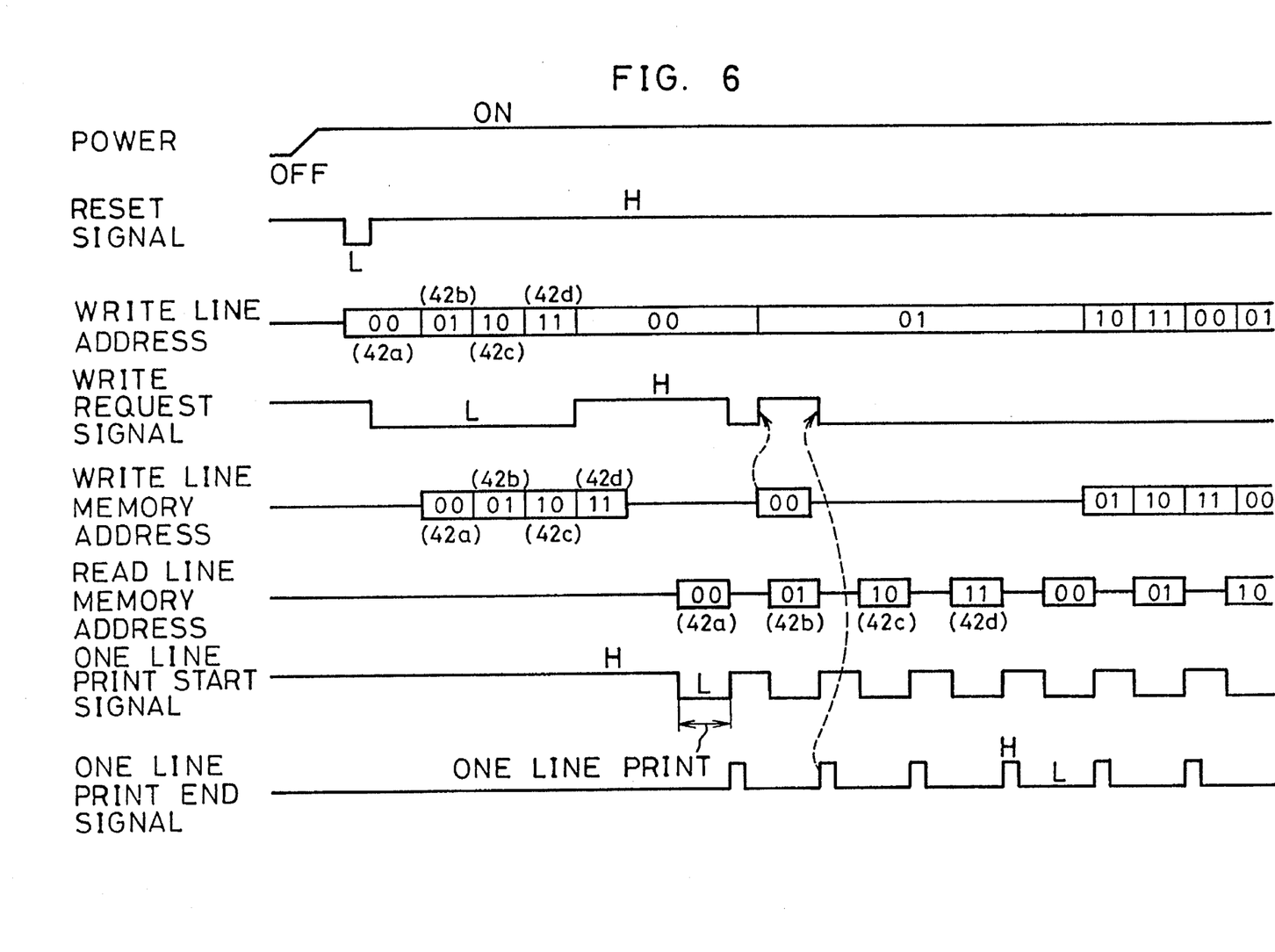
FIG. 6 shows signal waveforms at each circuit portion of the printer shown in FIG. 4.

Next, the operation of this embodiment will be briefly described with reference to FIG. 6. When a power is turned on, a reset signal at CPU 41 is supplied to the print controller 43 to reset the write counter 53, read counter 54, and up-down counter 55.

When the up-down counter 55 is reset, the write request signal "0" is sent to CPU 41 which in turn receives the write line memory address CWA from the write counter 53 and sends it as the write line memory address WA to the port A of the line memory group 42 and to the gate circuit 57. Since the write counter 53 is also reset at this time, the write line memory addresses CWA and WA are both "00". As a result, the first line memory 42a of the line memory group 42 is designated. Next, CPU 41 outputs the address signal and write signal for designating each cell of the line memory 42a, and sequentially writes into the line memory 42a yellow image data of the first line read from the yellow frame memory 40a.

When the first write signal is output from CPU 41 in writing yellow image data of the first line, an output signal of the gate circuit 57 changes from "0" to "1" so that the edge detector 58 outputs the write start signal. Upon reception of this write start signal, the write counter 53 and up-down counter 55 change and count "01". When the write counter 53 is stepped incrementally, the gate circuit 57 is closed.

When the yellow image data of one line is written completely, CPU 41 receives the write line memory address CWA output from the write counter 53. Next, CPU 41 outputs the write line memory address WA of "01" to designate the second line memory 42b. CPU 41 writes into the line memory 42b yellow image data of the second line read from the yellow frame memory 40a. Similarly, yellow image data is written into the third line memory 42c.

The write counter 53 has the count value "11" when writing yellow image data of the fourth line, and so the fourth line memory 42d is designated. Upon a start of writing yellow image data, the edge detector 58 outputs the write start signal. When the write counter 53 counts this fourth write start signal, the write counter 53 is made to count "00". In addition, when the up-down counter 55 counts the fourth write start signal, the count value thereof become "4" in decimal and the up-down counter 55 outputs "1" to stop generating the write request signal. In the above manner, yellow image data is written in all the four line memories 42a to 42d.

In the meantime, CPU 41 drives the paper feed mechanism to start feeding the thermosensitive color recording paper 11. When the paper is being fed, the platen drum 10 stays in a situation where the clamper 12 is oriented vertically as shown in FIG. 1. When the power is turned on, the solenoid 18 is energized to set the clamper 12 to a clamp release position. The pair of feed rollers 28 nip a thermosensitive color recording paper 11 supplied from a cassette (not shown) and transports it toward the platen drum 10. The feed rollers 28 stop rotating when the leading edge of the thermosensitive color recording paper 11 is placed between the platen drum 10 and clamper 12. Thereafter, the solenoid 18 is turned off, so that the clamper 12 is moved backward by the force of the spring 17. As a result, the leading end of thermosensitive color recording paper 11 is clamped by the clamper 12. After clamping the thermosensitive color recording paper 11, the platen drum 10 and the feed rollers 28 start rotating, so that the thermosensitive color recording paper 11 is wound on the outer periphery of the platen drum 10.

As the platen drum 10 rotates intermittently at an interval of a predetermined step and when the top of the recording area of the thermosensitive color recording paper 11 reaches the position of the thermal head 20, a print ready signal is input to CPU 41. Upon reception of this signal, CPU 41 sends the one line print start signal to the read controller 56 which in turn sends the address signal and read signal to the port B of the line memory group 42. The first line memory 42a is designated by the count value "00" counted in the read counter 54, so that the yellow image data of the first line written in the line memory 42a is read one pixel after another and sent to the comparator 44.

The comparator 44 compares the yellow image data (A) of each pixel with the comparison data (B) outputted from CPU 41, and outputs the comparison result as drive data. The first comparison data (B) has a gradation level "0" so that the drive data for all pixels of one line is "1". The serial drive data of one line output from the comparator 44 is sent to the shift register 45, shifted therein synchronously with clocks, and converted into parallel drive data.

The parallel drive data is latched by the latch array 46 and sent to the AND gate array 47. A logical product between the drive data and the strobe is obtained by the AND gate array 47. From each output terminal of the AND gate array 47, a signal "1" is outputted for the signal "1" at each output terminal of the latch array 46. For example, if the first output terminal of the AND gate array 47 outputs a signal "1", the transistor 48a turns on to power the heating element 49a and supplies a bias heating energy to the thermosensitive color recording paper 11. At this bias heating, the thermosensitive color recording paper 11 is heated for a relatively long time because of a wide pulse width of the strobe signal.

After the bias heating, CPU 41 outputs the comparison data having a gradation level "1", and as described previously, the comparator 44 compares again the yellow image data of each pixel of one line with the comparison data. The comparator 44 outputs "1" for the pixel recording a yellow image, and outputs "0" for the pixel not recording a yellow image. Only the heating element for the pixel corresponding to the output "1" of the comparator 44 is heated while a short strobe signal is inputted. Similarly, the image data is compared with the comparison data having a gradation levels from "2" to "63" to render a gradation representing heat energy to the thermosensitive color recording paper 11.

When the yellow image data of the first line has been printed completely, CPU 41 outputs the one line print end signal to the read counter 54 and up-down counter 55. The read counter 54 changes to count "01" so that the second line memory 42b is designated. The up-down counter 55 changes to count "3" in decimal, and so the write request signal is sent to CPU 41.

Upon reception of the write request signal, CPU 41, if not processing another task, starts writing image data to the line memory group 42. The write counter 53 has counted four write start signals and has the count value "00". Receiving this write line memory address CWA of "00", CPU 41 designates the idle first line memory 42a to write yellow image data of the fifth line in the manner described above. In this case, when the write signal for the first pixel in one line is output from CPU 41, the gate circuit 57 and edge detector 58 generate the write start signal to step incrementally the write counter 53 and up-down counter 55. The up-down counter 55 again takes a value "4" in decimal so that generating the write request signal is stopped.

After the first line has been printed completely, the platen drum 10 rotates by one line to feed the thermosensitive color recording paper 11. After this paper feeding, CPU 41 sends the one line print start signal to the read controller 56. At this time, the read counter 54 is outputting the read line memory address RA of "01", so that the second line memory 42b is designated and yellow image data of the second line is read therefrom to print it out on the thermosensitive color recording paper 11.

Thereafter, like the above operations, yellow image data of one line is cyclically read from the line memory group 42 and printed onto the thermosensitive color recording paper 11. If the write request signal has been generated and CPU 41 can intercept another task presently processing, then CPU 41 writes yellow image data of one line read from the yellow frame memory 40a to the line memory designated by the write counter 53.

As the platen drum 10 rotates, the area of the thermosensitive color recording paper 11 where the yellow image has been thermally recorded, reaches the optical fixing device 21 which in turn optically fixes the yellow thermosensitive coloring layer 35. The use of the sharp-cut filter 24 of the optical fixing device 21 disposed in the front of the ultraviolet lamp 23 radiates near ultraviolet rays near a wavelength of 420 nm to the thermosensitive color recording paper 11. As a result, a diazonium salt compound contained in the yellow thermosensitive coloring layer 11 is decomposed and its coloring ability is lost.

After the platen drum 10 makes one rotation and when the recording area again reaches the position of the thermal head 20, a magenta image is printed. During the paper feeding, the print controller 43 is reset for the preparation of writing and reading magenta image data. In the manner like writing yellow image data, magenta image data of four lines read from the magenta frame memory 40b is sequentially written into the line memory group 42.

Thereafter, the magenta image data of each line is read from the line memory group 42 to print the magenta image of one line on the thermosensitive color recording paper 11. If there is an idle line memory while one line is printed, then the magenta image of one line read from the magenta frame memory 40b is written into the idle line memory.

A strobe signal having a wider pulse width than that used for yellow image data is used for printing a magenta image. As a result, the coloring heat energy for the magenta image is greater than the yellow image. The yellow thermosensitive coloring layer 35 is not colored again when printing a magenta image, because this layer 35 has already been optically fixed.

The thermosensitive color recording paper 11 having recorded the magenta image is optically fixed by the optical fixing device 21, in the manner described above. In this case, the sharp-cut filter 24 is retracted from the front of the ultraviolet lamp 23 when the magenta image starts being printed. Therefore, all electromagnetic waves radiated from the ultraviolet lamp 23 are applied onto the thermosensitive color recording paper 11. Of the electromagnetic waves, ultraviolet rays near a wavelength of 365 nm optically fix the magenta thermosensitive coloring layer 34.

As the platen drum 10 rotates once again and when the recording area again reaches the position of the thermal head 20, a cyan image is printed. While the cyan image is being printed, reading the cyan frame memory 40c and reading/writing with the line memory group 42 are performed at suitable timings. A strobe signal having a widest pulse width is used for printing a cyan image. As a result, a large coloring heat energy is supplied to the thermosensitive color recording paper 11 for printing a cyan image one line after another. The cyan thermosensitive coloring layer 33 has such a coloring heat energy as it does not develop color under a normal condition in preservation. Therefore, no optical fixability is given to the cyan thermosensitive coloring layer 33. Accordingly, the optical fixing device 21 is turned off during the thermal recording for the cyan thermosensitive coloring layer 33.

After the completion of thermal recording of the yellow, magenta, and cyan images, the platen drum 10 and the feed rollers 28 are rotated in the reverse direction. As a result, the trailing edge of the thermosensitive color recording paper 11 is guided by the separation claw 29 to the paper feed path 27 and nipped by the feed rollers 28. When the platen drum 10 reaches thereafter the paper feed position, the solenoid 18 is energized and the rotation of the platen drum 10 is stopped. When the solenoid 18 is energized, the clamper 12 moves against the force of the spring 17 to release the clamp of the leading edge of the thermosensitive color recording paper 11. As a result, the thermosensitive color recording paper 11 with a recorded color image is ejected via the paper feed path 27 onto a receptacle tray.

In this embodiment, a color thermal printer in use with thermosensitive paper been described. The invention is also applicable to other printers such as a thermal transfer printer, an ink jet printer, and a laser printer. The invention is also applicable not only to a line printer, but also a serial printer.

Although the present invention has been described with reference to the preferred embodiment shown in the drawings, the invention should not be limited by the embodiments but, on the contrary, various modifications, changes, combinations and the like of the present invention can be effected without departing from the spirit and scope of the appended claims.

I claim:

1. A line memory controller for controlling a read/write operation of reading from and writing into a line memory group with image data of one line, the line memory group including N line memories, wherein said N is an integer equal to 3 or larger, said line memory controller comprising:

a write counter for counting a write start signal indicating a start of writing said image data of one line, and for outputting a first count value adapted to designate a write line memory into which said image data of one other line is to be written among said line memories;

a read counter for counting an one line print end signal indicating a completion of printing said image data of one line, and for outputting a second count value adapted to designate a read line memory from which said image data of said one line is to be read among said line memories;

an up-down counter, counting up in response to said write start signal and counting down in response to said one line print end signal, for outputting a third count value indicating availability of write line memories in an idle condition and for generating a write request signal when said third count value is equal to or smaller than "N−1";

a CPU for writing said image data of one line into said write line memory group after confirming generation of said write request signal, said CPU outputting a write line memory address to designate said write line memory in accordance with said first count value; and a read controller for reading said image data of one line from said read line memory designated by said read counter, said read controller being activated by an one line print start signal from said CPU.

2. A line memory controller according to claim 1, wherein:

said CPU outputting a write address of each pixel of said image data and outputting a write signal for instructing to write said image data of each pixel, when writing said image data of one line into said write line memory; and said read controller outputting a read address of each pixel of said image data and outputting a read signal for instructing to read said image data of each pixel, when reading said image data of one line from said write line memory.

3. A line memory controller according to claim 2, further comprising:

a gate circuit for generating a pulse when said write signal is input and if said first count value of said write counter coincides with said write line memory address output from said CPU; and an edge detector for detecting an edge of said pulse and generating a write start signal.

4. A line memory controller according to claim 3, wherein said gate circuit includes a plurality of exclusive OR gates for comparing said first count value with said write line memory address at each pixel, and a NAND gate, provided with outputs from said plurality of exclusive OR gates and said write signal, for outputting said write start signal from said edge detector.

5. A line memory controller according to claim 4, wherein said image data of one line serially read from said read line memory is sent to a head driver for recording said image data of one line on a recording medium.

6. A method for controlling a read/write operation of reading from and writing into a line memory group, having at least three line memories, with image data of one line, comprising the steps of:

(a) designating a write line memory into which said image data is to be written among said line memories, when a write start signal indicating a start of writing said image data is counted by a write counter;

(b) designating a read line memory from which said image data is to be read among said line memories, when an one line print end signal indicating a completion of printing said image data of one line is counted by a read counter;

(c) indicating availability of write line memories in a writable condition, and generating a write request signal when two or more write line memories are in said writable condition, by counting up in response to said write start signal and counting down in response to said one line print end signal by an up-down counter;

(d) writing said image data of one line into said write line memory designated in said step (a), when said write request signal is generated; and (e) reading said image data of one line from a read line memory designated by said step (b), when a print start signal is generated.

* * * * *